United States Patent
Zehr et al.

(10) Patent No.: US 8,919,541 B2
(45) Date of Patent: Dec. 30, 2014

(54) QUICK-RELEASE CONVEYOR BELT CONTAINMENT DEVICE

(71) Applicant: Dynamic Conveyor Corporation, Muskegon, MI (US)

(72) Inventors: Matthew A. Zehr, Walker, MI (US); Paul A. Kuharevicz, Muskegon, MI (US)

(73) Assignee: Dynamic Conveyor Corporation, Muskegon, MI (US)

( * ) Notice: Subject to any disclaimer, the term of this patent is extended or adjusted under 35 U.S.C. 154(b) by 0 days.

(21) Appl. No.: 13/955,301

(22) Filed: Jul. 31, 2013

(65) Prior Publication Data

US 2014/0116857 A1    May 1, 2014

Related U.S. Application Data

(60) Provisional application No. 61/718,440, filed on Oct. 25, 2012.

(51) Int. Cl.
  *B65G 21/20*   (2006.01)
  *B65G 41/00*   (2006.01)
(52) U.S. Cl.
  CPC ..................................... *B65G 41/00* (2013.01)
  USPC ..................................... 198/836.1; 198/860.1
(58) Field of Classification Search
  CPC ........... B65G 21/2063; B65G 21/2072; B65G 21/2081
  USPC .............. 198/836.1, 836.4, 837, 860.1, 860.2
  See application file for complete search history.

(56) References Cited

U.S. PATENT DOCUMENTS

| | | | | |
|---|---|---|---|---|
| 3,491,873 | A * | 1/1970 | Fauth | 198/836.1 |
| 5,082,108 | A * | 1/1992 | Douglas | 198/836.4 |
| 6,196,375 | B1 * | 3/2001 | Cozza | 198/836.1 |
| 6,269,943 | B1 * | 8/2001 | Mott | 198/823 |
| 6,427,831 | B1 * | 8/2002 | Norton | 198/841 |
| 6,666,325 | B1 * | 12/2003 | Buenning et al. | 198/782 |
| 6,830,146 | B1 * | 12/2004 | Scully et al. | 198/836.1 |
| 7,673,741 | B2 * | 3/2010 | Nemedi | 198/841 |
| 7,789,220 | B2 * | 9/2010 | Bell et al. | 198/836.1 |
| 7,997,405 | B2 * | 8/2011 | Karpy | 198/860.1 |
| 8,746,443 | B2 * | 6/2014 | Araya Arancibia et al. | 198/836.1 |

* cited by examiner

*Primary Examiner* — Leslie A Nicholson, III
*Assistant Examiner* — Keith R Campbell
(74) *Attorney, Agent, or Firm* — Price Heneveld LLP

(57) ABSTRACT

A belt conveyor apparatus includes a conveyor frame with a belt support, a belt, a belt drive, and containment side members releasably attached to the conveyor frame. Specifically, a linear first slot and arcuate second slot on the conveyor frame engage permanently-attached first and second studs on the containment side members to allow rotational assembly of the containment side member to the conveyor frame. The path of engagement prevents the studs from being removed simultaneously from respective slots. As a result, the first and second studs will wedgingly bind and thus cannot be simultaneously pulled out of the first and second slots when the containment side member is biased toward a release direction. Related methods are also disclosed.

9 Claims, 4 Drawing Sheets

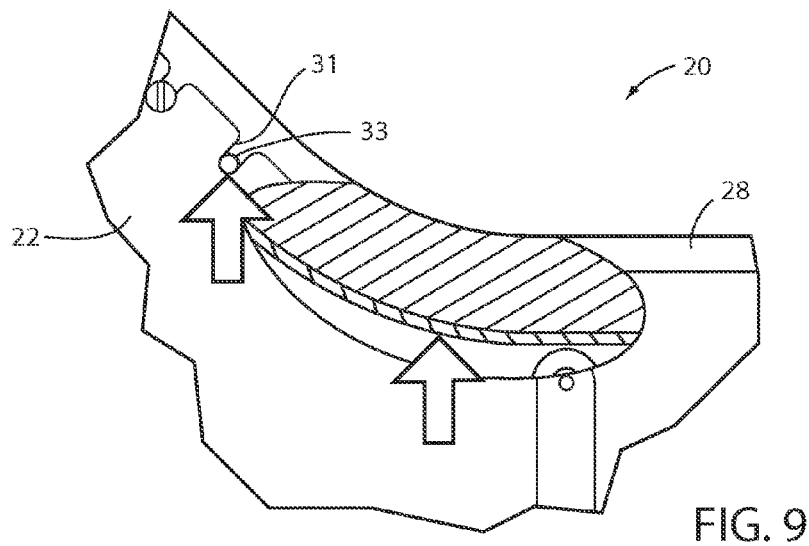
FIG. 9
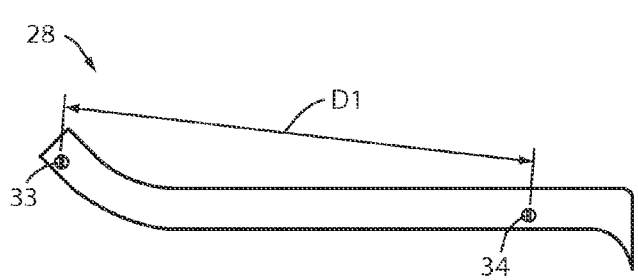
FIG. 10
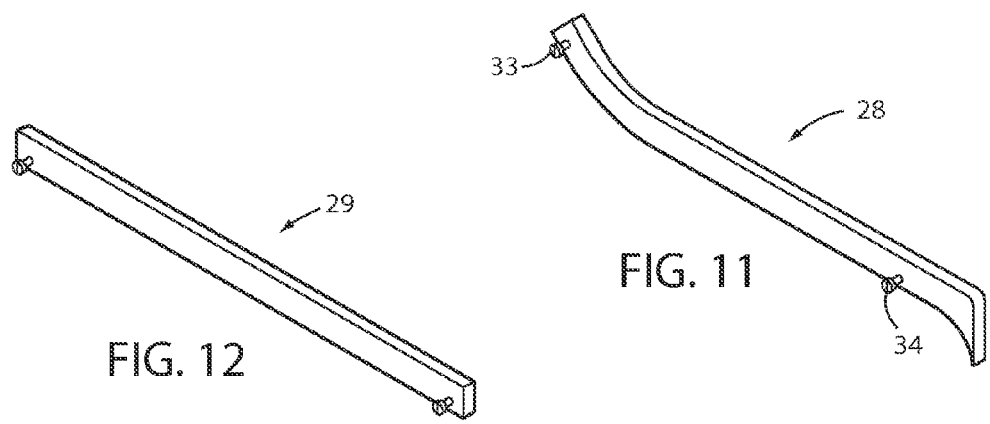
FIG. 12
FIG. 11
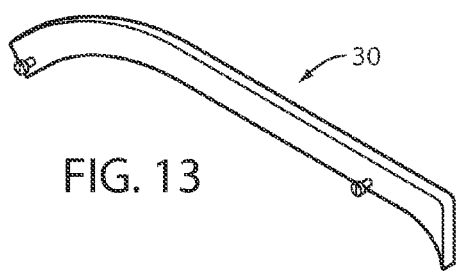
FIG. 13

QUICK-RELEASE CONVEYOR BELT CONTAINMENT DEVICE

This application claims benefit under 35 USC §119(e) of provisional application Ser. No. 61/718,440, filed Oct. 25, 2012, entitled QUICK-RELEASE CONVEYOR BELT CONTAINMENT DEVICE, the entire contents of which are incorporated herein by reference.

BACKGROUND

The present invention relates to conveyors with belt containment devices, and more particularly to a conveyor having a belt containment device that is releasably attached for quick removal without the use of separate fasteners and that is well suited for environments and industries requiring cleanliness and sterility.

Belt conveyors with containment side members are often used to convey food. The containment side members hold food items on the belt, but are made removable for cleaning and sterilization purposes. Sometimes, the containment side members are also used to prevent a conveyor belt from lifting off an underlying belt support, such as when the belt is tensioned across a concave transition zone leading from a horizontal lower section of a conveyor to an inclined elevating section of the conveyor. However, known removable containment side members use separate fasteners for attachment to the conveyor, such as threaded bolts and nuts. These can cause quality and warranty problems, and can lead to food contamination, because threaded fasteners include crevices and difficult-to-clean areas which greatly reduce the ability to easily clean and sterilize the conveyor. Further, fasteners require time to remove and, once removed, can get lost. Still further, fasteners require reinstallation time and, if not properly installed, can fall out. This is particularly problematic if the fasteners fall onto the belt since they can contaminate the food. An improvement is desired for attachment of containment side members that is simple, does not include separate fasteners nor threaded fasteners, is easily cleaned and sterilized, and is less manually intensive to remove and reattach.

SUMMARY OF THE PRESENT INVENTION

In one aspect of the present invention, a belt conveyor apparatus includes a conveyor frame including a belt support, a belt, a belt drive, and a containment side member on each side of the conveyor releasably attached to the conveyor frame. An improvement comprises spaced-apart first and second slots on the conveyor frame, the first and second slots including slot bottoms spaced apart a first distance and slot entrances spaced apart a second distance, with one of the slot entrances defining a distance to the other slot's bottom that is equal to the first distance. The improvement also includes first and second studs on the containment side member that closely engage the slots, respectively, and that are spaced apart the first distance so that they can be fully seated and engaged in the first and second slots, but so that the first and second studs will wedgingly bind and thus cannot be simultaneously pulled out of the first and second slots when the containment side member is biased toward a release direction.

In a narrower aspect of the present invention, the first slot includes linear edge surfaces, and the second slot includes arcuate edge surfaces, the arcuate edge surfaces defining a radius with a center point generally proximate a bottom of the first slot.

In another aspect of the present invention, a belt conveyor apparatus comprises a conveyor frame including a belt support, a belt, and a belt drive; and a containment side member on each side of the conveyor releasably attached to the conveyor frame by spaced-apart first and second slots and by first and second studs that closely engage the slots, respectively, the first and second slots each defining a slot bottom position and a slot entrance position. The apparatus further includes the first slot bottom position and the second slot bottom position defining a first distance equal to a distance between the first and second studs; the first slot bottom position and the second slot entrance position also being equal to the first distance, such that the containment side member can be installed by placing the first stud in the first slot, then rotating the containment side member to move the second stud through the second slot entrance position into the second slot bottom position; and the first slot entrance position and the second slot entrance position defining distance different from the first distance such that pressure on the containment side member that biases both the first and second studs toward respective slot entrance positions causes binding and thus does not result in detachment of the containment side member from the conveyor frame.

In another aspect of the present invention, an improvement is provided in a belt conveyor apparatus, where the apparatus includes a conveyor frame, a belt support, a belt, a belt drive, and containment side members on each side of the conveyor. The improvement includes spaced-apart first and second connectors permanently attached to the conveyor frame and spaced-apart third and fourth connectors permanently attached to the containment side members. The first and second connectors releasably engage the third and fourth connectors, respectively, along dissimilar paths of engagement that prevent simultaneous release.

In another aspect of the present invention, a method of assembling and disassembling a belt conveyor apparatus includes providing a conveyor frame including a belt support, a belt, a belt drive, and a containment side member on each side of the conveyor releasably attached to the conveyor frame; providing spaced-apart first and second slots on the conveyor frame, the first and second slots including slot bottoms spaced apart a first distance and slot entrances spaced apart a second distance, with one of the slot entrances defining a distance to the other slot's entrance that is equal to the first distance; providing first and second studs on the containment side member located to closely engage the slots, respectively, and that are spaced apart the first distance so that they can be fully seated and engaged in the first and second slots; extending the first stud through the first slot entrance and to the first slot bottom; rotating the containment side member to extend the second stud through the second slot entrance and into the second slot bottom, to thus position the containment side member so that an upward bias on the containment side member wedges the first and second studs thus preventing their simultaneous release from the first and second slots.

In another aspect of the present invention, a method of attaching a containment side member to a conveyor frame comprises providing spaced-apart first and second connectors permanently attached to the conveyor frame and spaced-apart third and fourth connectors permanently attached to the containment side members, and releasably engaging the first and second connectors with the third and fourth connectors, respectively, along dissimilar paths of engagement, where structure on the containment side member and the conveyor frame that define the dissimilar paths of engagement also prevent simultaneous release.

An object of the present invention is to provide a conveyor apparatus with conveyor belt containment device that can be used with a conveyor of sanitary design. The device is designed to contain the product being conveyed (side-to-side), but most significantly, the device allows for conveyor belt inclination changes, yet allows quick disassembly and reassembly without the need for separate loose fasteners.

An object of the present invention is to provide an arrangement permitting disassembly and reassembly that is tool-less, fastener-less, and that can be done quickly. Specifically, because the containment side member can be taken out of or reinstalled into the conveyor effortlessly and quickly, it will significantly reduce the cost of ownership for conveyor(s) that need daily cleaning.

These and other aspects, objects, and features of the present invention will be understood and appreciated by those skilled in the art upon studying the following specification, claims, and appended drawings.

BRIEF DESCRIPTION OF DRAWINGS

FIG. 9 is an enlarged view of the circled area IX in FIG. 8 showing upward biasing forces from a tensioned conveyor belt against the stud and slot at the concave corner of the conveyor where the conveyor belt transitions from a lower horizontal region onto an upwardly-angled inclined section;

FIGS. 10-11 are perspective and side views of the lower containment side member in FIG. 1; and FIGS. 12-13 are perspective views of the middle and upper containment side members shown in FIG. 1.

DETAILED DESCRIPTION OF PREFERRED EMBODIMENTS

Figure 1:
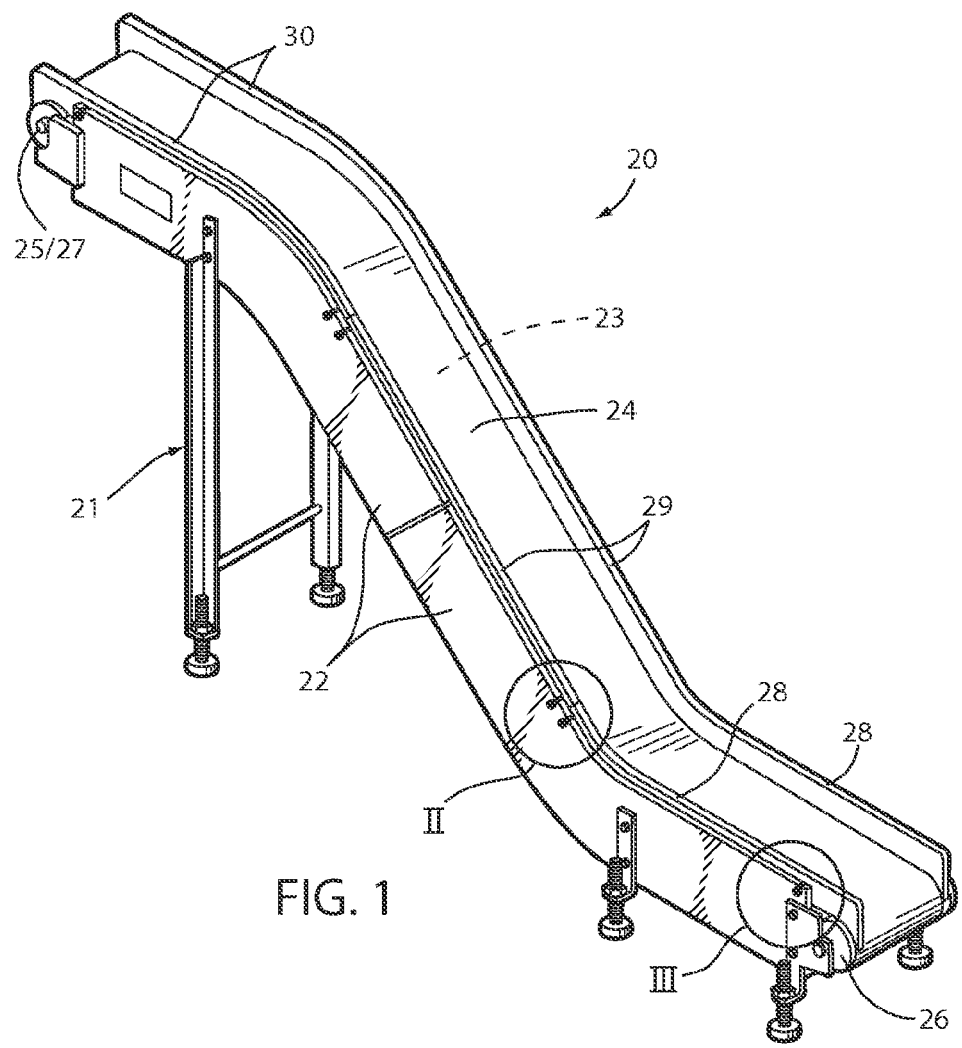
FIG. 1 is a perspective view of a conveyor embodying the present invention.
Figure 2:
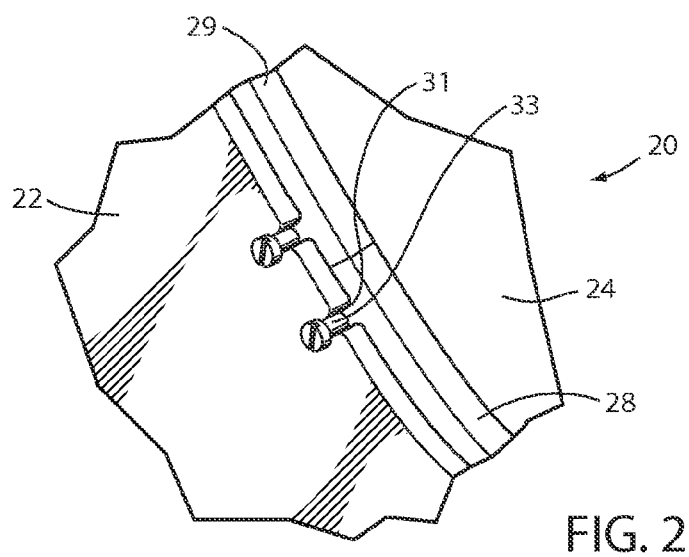
FIGS. 2-3 are enlarged fragmentary views of circled areas II and III, respectively, in FIG. 1.
Figure 3:
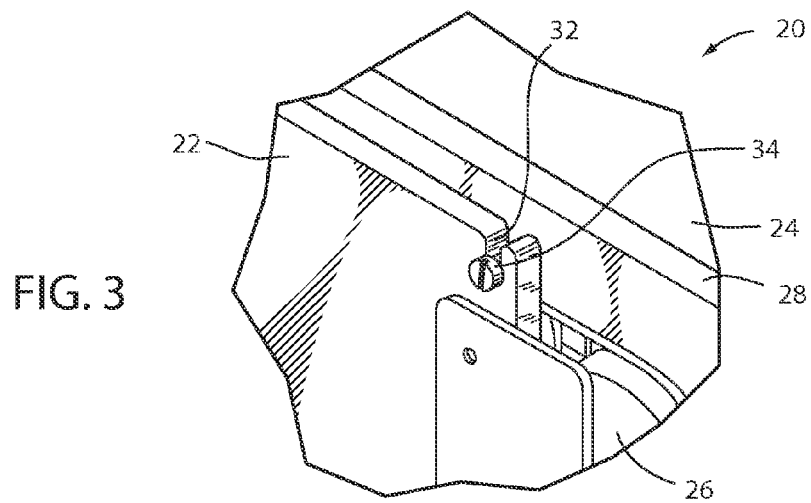
Figure 4:
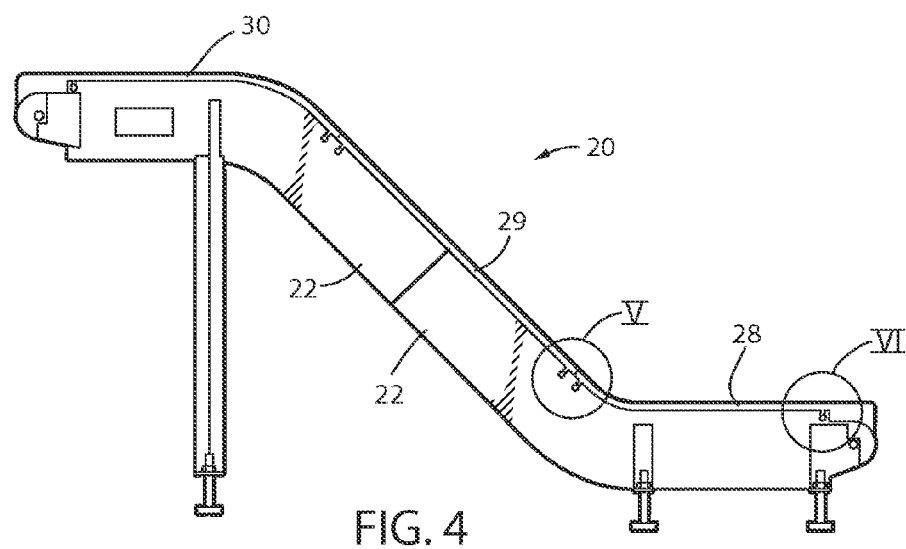
FIGS. 4-6 are side views of FIGS. 1-3 respectively.

The present belt conveyor 20 (FIG. 1) includes a conveyor frame 21 with side frame panel members 22, belt support 23, a belt 24, a belt control and drive 25, end roller 26 and driving roller 27. Multiple containment side members 28-30 are releasably attached to the side frame panel members 22 of the conveyor frame 21. The illustrated conveyor 20 is Z-shaped, and includes a lower horizontal section, an angled/inclined section, and an elevated upper horizontal section. The illustrated lower containment side member 28 is elongated to include a horizontal section and an end section transitioning onto an angled portion of the conveyor 20. As a result, the belt 24 when tensioned, places an upward bias on the containment side member 28. Nonetheless, an attachment system is provided on containment side member 28 that does not include separate loose fasteners, but instead that uses upwardly-open slots and permanently-attached mating studs. It is noted that the present containment side members 28-30 are made from ultra-high-molecular-weight polyethylene (UHMW PE) or similar lubricious material suitable for use in a food or pharmaceutical conveyor, and capable of use in a clean and sterile environment. The UHMW PE material provides a solid, low wear, bearing surface that has a low coefficient of sliding friction (between the moving conveyor belt and the device), and yet is structural and able to securely retain studs 33 and 34 on the frame 21 discussed below.

Specifically, the containment side member 28 is mounted to respective side frame panel members 22 as follows. A linear first slot 31 and arcuate second slot 32 (also called "connectors" herein) on the conveyor frame engage permanently-attached first and second studs 33 and 34 (also called "connectors" herein) protruding outwardly from the containment side member 28. The slots 31 and 32 are shaped to allow rotational assembly of the containment side member 28 to the conveyor frame 21, but they prevent the studs 33 and 34 from being simultaneously removed from respective slots 31 and 32 when the containment side member 28 is biased by a linear upward force. As a result of any such linear upward force, the first and second studs 33 and 34 will wedgingly bind in the slots 31 and 32, and thus they cannot be simultaneously pulled out of the first and second slots 31 and 32 when the containment side member is biased toward a release direction. This arrangement results in elimination of several quality and warranty problems, including potential food contamination from loose fasteners and/or fasteners that fall off assembled conveyors. Also, it eliminates exposed threads and inherent crevices and difficult-to-clean areas in the present conveyor. Further, assembly and disassembly time is greatly reduced. Further, the components are simple, few in number, and easily cleaned and sterilized.

Figure 5:
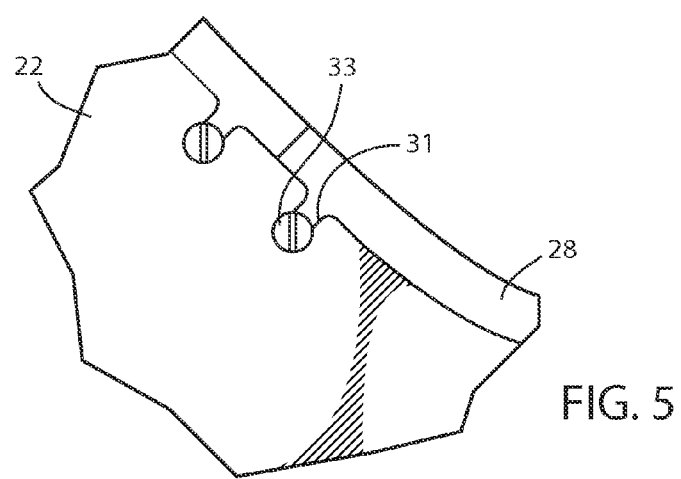
Figure 6:
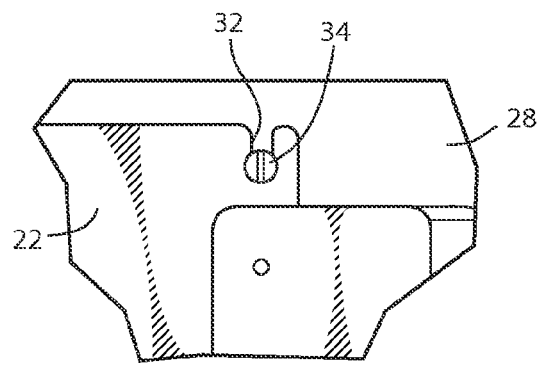
Figure 7:
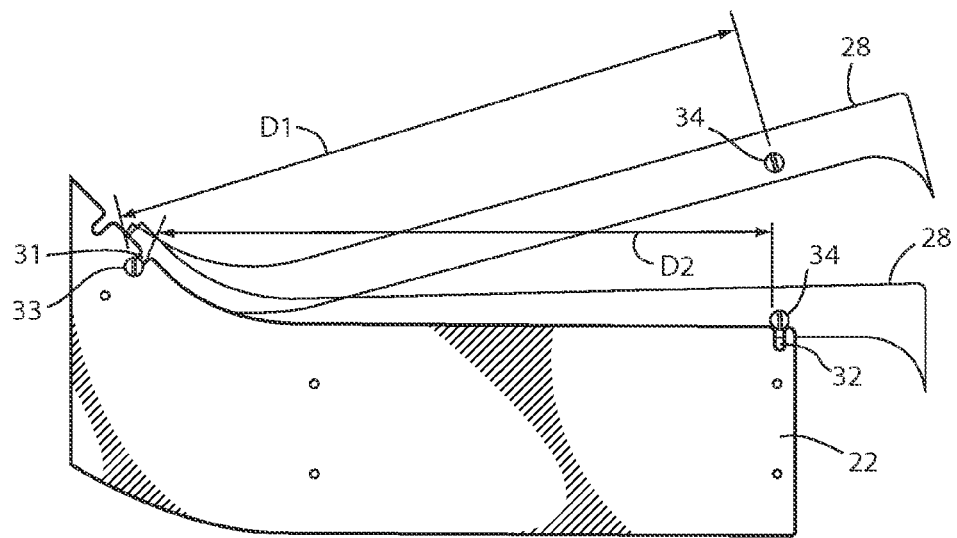
FIG. 7 is a side view showing rotating engagement of the containment side member with the side panel member of the conveyor frame.
Figure 8:
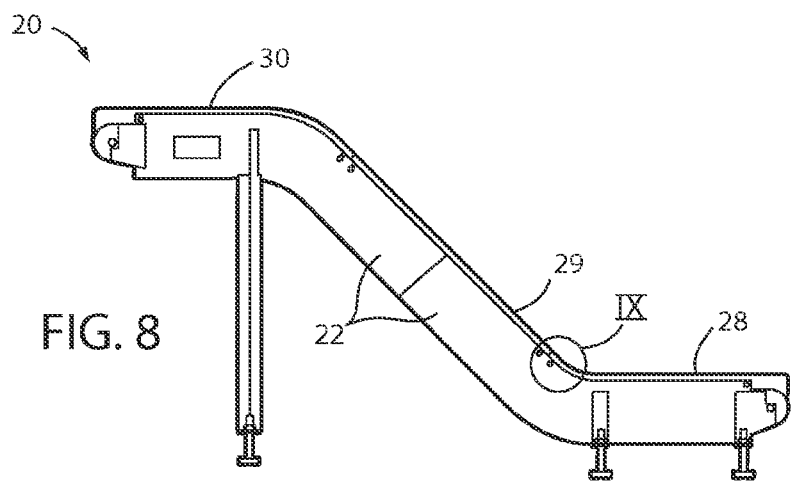
FIG. 8 is a side view like FIG. 4.

The illustrated first linear slot 31 (FIGS. 5 and 9) is angled sufficiently to cause interference preventing simultaneous removal/disengagement of the connectors 31/32/33/34, as discussed above and below. Specifically, the illustrated slot 31 is angled from vertical by about 40-50 degrees, or more, preferably about 45 degrees. The illustrated arcuate slot 32 is arched at a radius of just short of a length of the containment side member 28. Specifically, the radius R is equal to a distance between the slots 31 and 32, which as illustrated is about 25-30 inches distance. It is contemplated that the arcuate slot 32 could be varied somewhat from being an arcuate shape, and also it is contemplated that the slot 32 will open generally vertically, which contrasts to the angled orientation of the first slot 31. The first and second slots 31 and 32 including slot bottoms spaced apart a first distance D1 and slot entrances spaced apart a second distance D2 different from the first distance D1, with one of the slot entrances 31B, 32B defining a distance to the other slot's entrance that is equal to the first distance D1. The first and second studs 33 and 34 on the containment side member 28 have a shaft size and diameter chosen to closely engage the slots 31, 32, respectively. The studs 33, 34 are spaced apart the first distance D1 so that they can be fully seated and engaged in the first and second slots 31, 32, but so that the first and second studs 33, 34 will wedgingly bind and thus cannot be simultaneously pulled out of the first and second slots 31, 32 when the containment side member 28 is biased toward a release direction (such as by the belt 24 being tensioned across a concave region, as shown in FIG. 9). In other words, the straight slot 31 and radius slot 32 together make a "wedge" that does not let the side member 28 come out when exposed the forces of the belt 24 as the belt 24 passes through a concave zone as it changes inclination. The only way the containment side member 28 can come out is when it is rotated out of the radius slot (see FIG. 7).

It is contemplated that the stud could be retained in the panel members by different means, such as by insert molding, friction fitting the stud into the panel member, and other means. It is contemplated that the studs 33 and 34 are permanently fixed to the panel member 28 so that they do not need to be removed (or more specifically, could not be removed) in order to disassemble the containment side member 28 from the conveyor frame 21. The illustrated device has two studs 33 and 34, but it is contemplated that additional studs could be used. The illustrated studs 33, 34 are stainless steel shoulder bolts threadably inserted into a blind, tapped hole in the UHMW PE. The UHMW PE binds the threads of the shoulder bolt, creating a vibration resistant fit preventing accidental release.

In the illustrated assembly, all basic major components of the conveyor 20 can be easily and quickly removed from the conveyor frame 21, including the containment side members 28-30, the side frame panel members 22, belt supports 23 (on the frame 21 under the belt 24), the belt drive 25, the end roller 26, and the driving roller 27. It is noted that the present stud and slot arrangements (or similar connecting arrangements) can be used to mount each of those components. In particular, it is noted that once the containment side member 28 is installed, the containment side member 29 (and in turn containment side member 30) are not able to shift toward the containment side member 28. This fact allows flexibility in the angle/orientation/shape of the slots used to mount the containment side members 29-30.

Notably, the illustrated first slot 31 includes linear edge surfaces, and the second slot 32 includes arcuate edge surfaces, the arcuate edge surfaces defining the radius R with a centerpoint generally proximate a bottom of the first slot 31. By this arrangement, the containment side member 28 can be installed by sliding the first stud 33 along a path of engagement until the first stud 33 is located in a bottom of the first slot 31, and then rotating the containment side member 28 along a dissimilar path of engagement to move the second stud 34 through the second slot entrance 32B into the bottom of the second slot 31. Since the first slot entrance 31A and the second slot entrance 32A define a distance different from the first distance, an upward pressure on the containment side member 28 (such as from a tensioned belt 24 across a concave region, see FIG. 9) that would normally bias both the first and second studs out of respective slot entrances, instead causes binding. Thus, it does not result in detachment of the containment side member 28 from the conveyor frame 21.

A method of assembling and disassembling a belt conveyor apparatus 20 includes providing a conveyor frame 21 including a belt support 23, a belt 24, a belt drive 25, and a containment side member 28-30 on each side of the conveyor releasably attached to a side frame panel member 22 of the conveyor frame 21. The method further includes providing spaced-apart first and second slots 31, 32 on the conveyor frame 21, with the first and second slots including slot bottoms spaced apart a first distance D1 and slot entrances spaced apart a second distance D2 different from the first distance D1. One of the slot entrances defines a distance to the other slot's entrance that is equal to the first distance D1, to allow assembly. Also, the method includes providing first and second studs 33, 34 on the containment side member 28 located to closely engage the slots, respectively, and that are spaced apart the first distance so that they can be fully seated and engaged in the first and second slots. The method includes extending the first stud 33 through an entrance to the first slot 31 and into a bottom of the first slot 31. The method includes rotating the containment side member 28 to extend the second stud 34 through the second slot's entrance and into a bottom of the second slot 32. This retains the containment side member 28 so that an upward bias on the containment side member 28 wedges the first and second studs 33, 34 thus preventing their simultaneous release from the first and second slots 31, 32.

The present conveyor is believed to be particularly useful in conveyor systems for food and pharmaceutical environments, and anywhere that sanitation, cleanliness, and/or an ability to quickly disassemble and reassemble is desired, especially where there is a desire or reason to minimize the use of separate fasteners.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. In a belt conveyor apparatus including a conveyor frame including a belt support, a belt, a belt drive, and a containment side member on each side of the conveyor releasably attached to the conveyor frame, an improvement comprising:

longitudinally spaced-apart first and second slots on the conveyor frame, the first and second slots including slot bottoms spaced apart a first distance and slot entrances spaced apart a second distance, with one of the slot entrances defining a distance to the other slot's bottom that is equal to the first distance; and longitudinally spaced-apart first and second studs on the containment side member that closely engage the slots, respectively, and that are spaced apart the first distance so that they can be fully seated and engaged in the first and second slots, but so that the first and second studs will wedgingly bind and thus cannot be simultaneously pulled out of the first and second slots when the containment side member is biased toward a release direction.

2. The improvement of claim 1, wherein the conveyor frame includes a conveyor side frame member including the first and second slots, and wherein the first and second studs each include a bolt threaded into the containment side member and that extends outwardly away from the conveyor belt for engagement with the first and second slots.

3. The improvement of claim 1, wherein the first slot includes linear edge surfaces and the second slot includes arcuate edge surfaces, the arcuate edge surfaces defining a radius with a centerpoint generally proximate a bottom of the first slot.

4. A belt conveyor apparatus comprising:

a conveyor frame including a belt support, a belt, and a belt drive; and a containment side member on each side of the conveyor releasably attached to the conveyor frame by longitudinally spaced-apart first and second slots and by longitudinally spaced-apart first and second studs that closely engage the slots, respectively, the first and second slots each defining a slot bottom position and a slot entrance position;

the first slot bottom position and the second slot bottom position defining a first distance equal to a distance between the first and second studs;

the first slot bottom position and the second slot entrance position also being equal to the first distance, such that the containment side member can be installed by placing the first stud in the first slot and then rotating the containment side member to move the second stud through the second slot entrance position into the second slot bottom position; and the first slot entrance position and the second slot entrance position defining distance different from the first distance such that pressure on the containment side member that biases both the first and second studs toward respective slot entrance positions causes binding and thus does not result in detachment of the containment side member from the conveyor frame.

5. A method of assembling and disassembling a belt conveyor apparatus including a conveyor frame including a belt support, a belt, a belt drive, and a containment side member on each side of the conveyor releasably attached to the conveyor frame, comprising steps of;

providing longitudinally spaced-apart first and second slots on the conveyor frame, the first and second slots including slot bottoms spaced apart a first distance and slot entrances spaced apart a second distance, with one of the slot entrances defining a distance to the other slot's entrance that is equal to the first distance;

providing longitudinally spaced-apart first and second studs on the containment side member located to closely engage the slots, respectively, and that are spaced apart the first distance so that they can be fully seated and engaged in the first and second slots;

extending the first stud through the first slot entrance and to the first slot bottom;

rotating the containment side member to extend the second stud through the second slot entrance and into the second slot bottom to thus position the containment side member so that an upward bias on the containment side member wedges the first and second studs thus preventing their simultaneously release from the first and second slots.

6. The method of claim 5, wherein the first and second studs each include a bolt threaded into the containment side member and having a shaft that extends outwardly away from the conveyor belt, and wherein the step of extending the first stud and the step of rotating to extend the second stud both cause the shaft of the respective first and second studs to engage the first and second slots, respectively.

7. The method of claim 5, wherein the step of providing a first slot includes providing linear edge surfaces, and wherein the step of providing the second slot includes providing arcuate edge surfaces, with the arcuate edge surfaces defining a radius with a centerpoint generally proximate a bottom of the first slot.

8. In a belt conveyor apparatus including a conveyor frame including a belt support, a belt, a belt drive, and a containment side member on each side of the conveyor releasably attached to the conveyor frame, an improvement comprising:

spaced-apart first and second slots on the conveyor frame, the first and second slots including slot bottoms spaced apart a first distance and slot entrances spaced apart a second distance, with one of the slot entrances defining a distance to the other slot's bottom that is equal to the first distance; and first and second studs on the containment side member that closely engage the slots, respectively, and that are spaced apart the first distance so that they can be fully seated and engaged in the first and second slots, but so that the first and second studs will wedgingly bind and thus cannot be simultaneously pulled out of the first and second slots when the containment side member is biased toward a release direction, wherein the conveyor frame includes a conveyor side frame member including the first and second slots, and wherein the first and second studs each are fixed into the containment side member and each extend outwardly in a horizontal outboard direction away from the conveyor belt for engagement with the first and second slots.

9. A method of assembling and disassembling a belt conveyor apparatus including a conveyor frame including a belt support, a belt, a belt drive, and a containment side member on each side of the conveyor releasably attached to the conveyor frame, comprising steps of;

providing spaced-apart first and second slots on the conveyor frame, the first and second slots including slot bottoms spaced apart a first distance and slot entrances spaced apart a second distance, with one of the slot entrances defining a distance to the other slot's entrance that is equal to the first distance;

providing first and second studs on the containment side member located to closely engage the slots, respectively, and that are spaced apart the first distance so that they can be fully seated and engaged in the first and second slots; wherein the conveyor frame includes a conveyor side frame member including the first and second slots, and wherein the first and second studs each are fixed into the containment side member and each extend outwardly in a horizontal outboard direction away from the conveyor belt for engagement with the first and second slots;

extending the first stud through the first slot entrance and to the first slot bottom;

rotating the containment side member to extend the second stud through the second slot entrance and into the second slot bottom to thus position the containment side member so that an upward bias on the containment side member wedges the first and second studs thus preventing their simultaneously release from the first and second slots.

* * * * *